Oct. 4, 1932. J. LAMOND 1,881,281

THREADING TOOL

Filed Oct. 6, 1931

INVENTOR
John Lamond,
By Archworth Martin,
Attorney.

Patented Oct. 4, 1932

1,881,281

UNITED STATES PATENT OFFICE

JOHN LAMOND, OF ALLISON PARK, PENNSYLVANIA

THREADING TOOL

Application filed October 6, 1931. Serial No. 567,205.

My invention relates to threading tools, and more particularly to taps, dies, chasers, and the like.

In the cutting of threads, difficulty is experienced in producing accurately-formed threads of proper smoothness, for the reason that particles of metal, known as "stickers" adhere at or become lodged between the sides of the cutting teeth or threads at points near the roots of the cutting threads. Even though the lodged particles or stickers are so small as to not be readily discernible to the eye, they cause the threads on the work being operated on to be so defective as to require scrapping of the work, or at least cause undesirable roughness on the threaded work. Not only do large quantities of work have to be scrapped, but the threading tools have to be frequently reconditioned or entirely replaced.

One object of my invention is to provide a threading tool of such form that the lodging of so-called stickers in the grooves of the cutting tool is avoided.

Another object of my invention is to provide a threading tool of such form that it will produce both a roughing cut and a finishing cut by a single continuous operation.

Still another object of my invention is to provide a threading tool of such form that it may be employed for high speed or mass production, without requiring frequent reconditioning or renewal, thereby reducing frequency of interruptions incident to changing threading tools.

Figure 1:
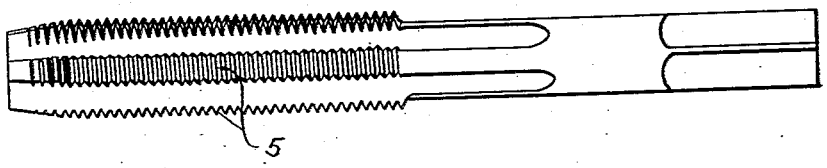
Figure 2:
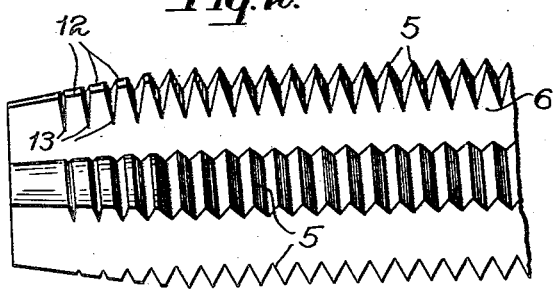
Figure 3:
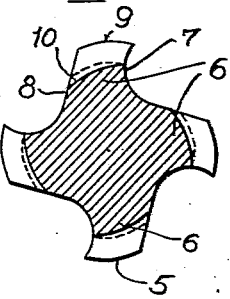
Figure 4:
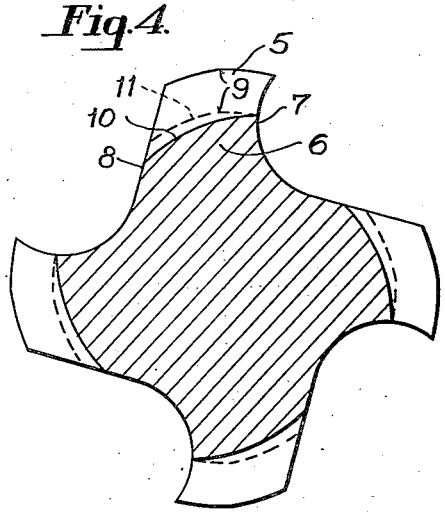
Figure 5:
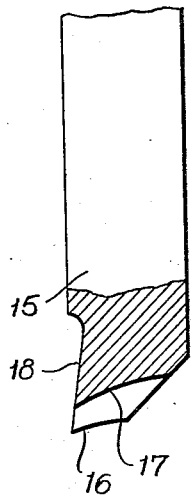
Figure 6:
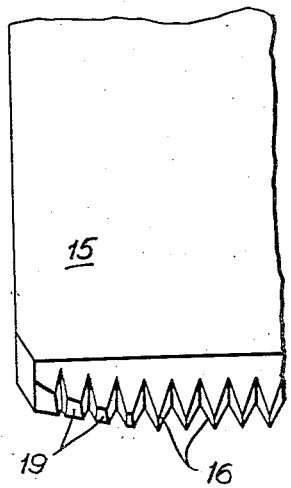

Some views embodying my invention are shown in the accompanying drawing wherein Figure 1 is a side view of a tap; Fig. 2 is a fragmentary view thereof, on an enlarged scale; Fig. 3 is a cross sectional view of the structure of Fig. 2; Fig. 4 is an exaggerated view showing more clearly the relief provided at the roots of the cutting threads; Fig. 5 is an end view of a pipe thread chaser, and Fig. 6 is a side view thereof.

Referring first to Figs. 1 to 4, I show a tap which in its general contour may be of somewhat standard form, but wherein the cutting teeth or threads have been modified according to my invention. The cutting teeth or threads 5 are formed on the lands 6 in somewhat the usual manner, they being shown as having the usual relief on their peripheral edges and sides, for about one-half the distance between the face 7 on each land and the heel 8 thereof, the point at which the relief commences being at the line 9 (Fig. 3). In some instances, manufacturers have formed the relief beginning at a point nearer to the face 7, in order to reduce tendency for the lodgment of stickers between the sides of the teeth 5, but such structures are likely to produce threads of wavy contour instead of true spirals.

The tops, sides and roots of the threads 5 are usually relieved in approximately equal degree, but I have found that by relieving the root or bottom of the groove between the threads to a greater extent, as indicated by the numeral 10, the lodging of stickers at the root is avoided. Preferably, I provide this relief along the line 10 throughout substantially the full length of the root, commencing at approximately the face 7 of the land, while the relief at the tops and sides of the threads 5 may begin at the half-way point 9 or at any other suitable point. The dotted line 11 indicates the usual amount of relief at the root, but, as indicated by the line 10, I cut the root deeper, to perhaps the extent of two-thousandths of an inch or even to a considerably greater extent, at the heel 8 of the land.

The additional relief at the root may be formed in any suitable manner. In providing standard cutters for the purpose of incorporating my invention therein, I may simply take a grinding tool having its edge narrower or of smaller angularity than the tool which was originally employed to cut the teeth, so that the grinding tool will cut the root surfaces to a greater depth without materially cutting away the sides of the threads 5.

In order to produce a roughing cut, I relieve the roots of the lead threads 12 of the tap in substantially the same manner as in the case of relief provided at 10, but the roots 13 of the lead threads are cut to a greater depth than at 10, instead of having the root bottoms of both the lead threads and the full threads all at the same distance from the axis of the tap, or in alinement with one another longitudinally of the tap.

When the lead threads or roughing threads become worn, it is necessary only to grind the face of the land, from the first lead thread 12 to the last lead thread, in order to recondition the roughing portion of the tap, it not being desirable or necessary to grind the face of the land at the portion thereof containing the full or finishing threads, since to do so, would prevent the cutting of properly-formed threads in the material being threaded.

It has been found that threads cut with dies having the additional root relief above-described, are much smoother than threads cut with various standard types of taps, and that the taps may be employed over a very much longer period of time than the older types of taps, without requiring reconditioning or replacement. Further, the scrap loss of work produced by my taps is reduced to a minimum.

Referring to Figs. 5 and 6, I show a pipe thread chaser 15, which is a segment of a pipe threading die. The chaser 15 has cutting teeth or threads 16 whose roots 17 are relieved from the faces 18 of the lands, to the heels thereof, and to a greater extent than the edges and sides of the teeth, as in the case of Figs. 1 to 3. The lead threads 19 serve as roughing elements as in the case of the threads 12 of Fig. 2, and have their roots relieved along their entire lengths, and to a greater depth than the tops and sides of the teeth.

It will be understood that the invention is applicable to various other forms of threading devices for cutting either internal or external threads on pipe couplings, pipes, etc.

I claim as my invention:—

1. A threading tool having cutting teeth relieved at their tops and sides and having the roots thereof relieved to a greater degree than said tops and sides.

2. A threading tool having cutting teeth relieved at their tops and sides and having the roots thereof relieved to a greater degree than said tops and sides, the said root relief being provided from the face of the land to the heel thereof.

3. A threading tool having cutting teeth relieved at their tops and sides and having the roots thereof relieved to a greater degree than said tops and sides, the said root relief being provided from the face of the land to the heel thereof, and the sides and faces of the teeth being relieved from a point substantially midway between the face of the land and the heel thereof.

4. A threading tool having a roughing portion and a full-thread cutting portion, both having teeth whose tops, sides and roots are relieved, the roots of the teeth being relieved to a greater degree than are the sides and the tops thereof, and the roots being cut more deeply in the roughing portion of the tool, the roots being relieved from the face of the land to the heel thereof.

5. A threading tool having a roughing portion and a full-thread cutting portion, both having teeth whose tops, sides and roots are relieved, the roots of the teeth in the roughing portion being relieved to a greater degree than are the sides and the tops thereof.

In testimony whereof I have hereunto set my hand.

JOHN LAMOND.